United States Patent [19]

Chizat et al.

[11] Patent Number: 4,672,004

[45] Date of Patent: Jun. 9, 1987

[54] NONCRYSTALLIZABLE SINGLE-COMPONENT ORGANOPOLYSILOXANE COMPOSITIONS

[75] Inventors: Francois Chizat, Bron; Bernard Chaussabel, Lyon, both of France

[73] Assignee: Rhone-Poulenc Specialites Chimiques, Courbevoie, France

[21] Appl. No.: 846,108

[22] Filed: Mar. 31, 1986

[30] Foreign Application Priority Data

Mar. 29, 1985 [FR] France ................................. 85 04760

[51] Int. Cl.$^4$ ................................................. B32B 9/04
[52] U.S. Cl. ..................... 428/447; 524/775;
524/773; 524/599; 524/601; 524/588; 528/17;
528/18; 528/34
[58] Field of Search ............... 524/775, 773, 599, 601,
524/588; 528/34, 17, 18; 428/447

[56] References Cited

U.S. PATENT DOCUMENTS

| | | | |
|---|---|---|---|
| 4,513,115 | 4/1985 | Beers | 524/773 |
| 4,528,353 | 7/1985 | Lucas | 524/34 |
| 4,532,315 | 7/1985 | Letoffe et al. | 528/34 |

Primary Examiner—Melvyn I. Marquis
Attorney, Agent, or Firm—Burns, Doane, Swecker & Mathis

[57] ABSTRACT

Noncrystallizable single-component organopolysiloxane compositions which are storage-stable in the absence of water, curable into elastomers at ambient temperatures and above in the presence of water, and which are well adopted for the production of silicone coatings and seals, include:

(A) at least one α,ω-dihydroxydiorganopolysiloxane polymer;
(B) a methyltriacetoxysilane cross-linking agent therefor; and
(C) an effective amount of at least one additive for preventing the crystallization of said cross-linking agent (B), miscible therewith in all proportions and liquid at ambient temperature, said additive comprising:
 (i) a diester of ortho-phthalic acid with a monoalcohol of the formula GOH, wherein G is a hydrocarbon radical containing from 4 to 12 carbon atoms; or
 (ii) an ester of acetic acid with a monoalcohol of the formula G'OH, wherein G' is hydocabon radical containing from 6 to 18 carbon atoms.

14 Claims, No Drawings

NONCRYSTALLIZABLE SINGLE-COMPONENT ORGANOPOLYSILOXANE COMPOSITIONS

BACKGROUND OF THE INVENTION

1. Field of the Invention

The present invention relates to single-component organopolysiloxane compositions prepared from hydroxylated diorganopolysiloxane oils, acid cross-linking agents comprising methyltriacetoxysilane and mixtures thereof with ethyltriacetoxysilane, and fillers, if appropriate. More especially, the present invention relates to such single-component organopolysiloxane compositions containing essential additives which retard or even completely eliminate the tendency of the acid cross-linking agents to crystallize.

2. Description of the Prior Art

The use of suitable means for preventing the crystallization of methyltriacetoxysilane at ambient temperature, or at lower temperatures, is known to this art; see French Patent No. 2,235,981, U.S. Pat. No. 4,116,935, French Patent No. 2,451,931 and published German Application No. 3,143,705.

French Patent No. 2,235,981 describes the use of an additive selective from the group consisting of dioxane, acrylonitrile, acetonitrile, trichloroethylene, butane sultone, butyl acetate and carbon tetrachloride to provide fungicidal activity and at the same time to depress the freezing point of methyltriacetoxysilane. The noted compounds, however, are either toxic or volatile (thus, half of these compounds have a flash point on the order of 40° C. or lower); consequently, at the stage of production of the compositions it is already necessary to use an elaborate, and hence costly, apparatus to avoid any major accident; furthermore, at the point in time of use of such compositions it would be essential to work in a well-aired and ventilated environment and, in addition, when the incorporated additive is toxic, to avoid certain fields of applications, for example, those involving contact with foodstuffs or with pharmaceutical products.

U.S. Pat No. 4,116,985 describes the use of a mixture of methyltriacetoxysilane and 1,3-dimethyltetraacetoxydisiloxane containing at least 20% and not more than 80% of one of the two components. This mixture does not appear to crystallize at low temperature and it produces compositions which are easy to extrude.

However, the manufacture of this mixture is cumbersome, since it necessitates several heating stages and sparging with an inert gas; on an industrial scale, a colored product is usually obtained, which cannot be used for the manufacture of transparent silicone elastomers.

French Patent No. 2,451,931 describes the reaction of methyltriacetoxysilane or ethyltriacetoxysilane with tertbutanol and an aqueous solution of acetic acid; Examples 1 and 2 show that the products obtained do not crystallize at −10° C. These products are complex mixtures which have the disadvantage of being difficult to reproduce; furthermore, they tend to form gels, which results in compositions which are heterogeneous in structure in thin layers.

German Application No. 3,143,705 teaches the use of formic acid to depress the crystallization temperature of methyltriacetoxysilane; this additive is claimed to be more effective than acetic acid or dioxane. It is well known, however, that formic acid can be used only with great care because of its corrosive nature in respect of many substances and its stinging effect on skin; the compositions in which it is present can therefore be used only in fairly restricted fields of applications.

SUMMARY OF THE INVENTION

Accordingly, a major object of the present invention is the provision of improved self-curable silicone compositions containing acid cross-linking agents and certain additives for retarding/preventing the crystallization thereof, and which improved compositions are essentially devoid of those disadvantages and drawbacks to date characterizing the state of this art.

Briefly, the present invention features novel single-component organopolysiloxane compositions which are stable in storage in the absence of water, which cure to elastomers at ambient temperature and above in the presence of water, and which comprise:

(A) at least one α,ω-dihydroxydiorganopolysiloxane polymer;

(B) a cross-linking agent therefor comprising methyltriacetoxysilane; and (C) an effective amount of at least one additive for preventing the crystallization of (B), which is miscible with (B) in all proportions and is liquid at ambient temperature, said additive comprising:
  (i) the diesters of ortho-phthalic acid with monoalcohols of the formula GOH, in which G is a hydrocarbon radical containing from 4 to 12 carbon atoms, and
  (ii) the esters of acetic acid with monoalcohols of the formula G'OH, in which G' is a hydrocarbon radical containing from 6 to 18 carbon atoms.

DETAILED DESCRIPTION OF THE PREFERRED EMBODIMENTS OF THE INVENTION

More particularly according to the present invention, the polymer (A) advantageously has a viscosity of 700 to 1,000,000 mPa.s at 25° C. and typically comprises a sequence of diorganosiloxy moieties of the formula $R_2SiO$, in which the symbols R, which may be identical or different, denote hydrocarbon radicals containing from 1 to 8 carbon atoms, substituted or unsubstituted by halogen atoms or cyano groups.

Preferably, the polymer (A) consists essentially of the moiety $(CH_3)_2SiO$ and contains up to 10 mol % of moieties of the formula $CH_3(CH_2=CH)SiO$ and/or $(C_6H_5)_2SiO$.

In a particular embodiment of the invention, up to 80% by weight of (B) can be replaced by ethyltriacetoxysilane.

According to a preferred embodiment of the invention, the subject composition comprises, per 100 parts of (A), 2 to 25 parts of (B) and 5 to 35% by weight of (C) based on the weight of (B).

Furthermore, the compositions according to the invention can additionally comprise a catalytically effective amount of a curing catalyst (D), in an amount which can range up to 5 parts of (D) per 100 parts of (A) and/or up to 250 parts of filler (E) per 100 parts of polymer (A).

The compositions according to the invention are essentially characterized by incorporating, during the formulation thereof, the additional component (C), preferably in a proportion of 5 to 35% by weight based on the cross-linking agent (B).

The additive (C) must be a compound which is liquid at ambient temperature and miscible in all proportions with the cross-linking agent (B).

As indicated above, the α,ω-dihydroxydiorganopolysiloxane polymer (A), which is essential for the preparation of the compositions according to the invention, has a viscosity of 700 to 1,000,000 mPa.s at 25°, preferably 1000 to 700,000 mPa.s at 25° C.; it is comprised of a sequence of diorganosiloxy moieties of the above-mentioned formula $R_2SiO$ and blocked by a hydroxyl group at each end of its polymer chain; this polysiloxane can also comprise monoorganosiloxy moieties of the formula $RSiO_{1.5}$ and/or siloxy moieties of the formula $SiO_2$, in a proportion not exceeding 2% relative to the total number of diorganosiloxy moieties.

The hydrocarbon radicals, substituted or unsubstituted by halogen atoms or cyano groups, denoted by the symbols R, are advantageously selected from among:

(a) Alkyl and haloalkyl radicals containing from 1 to 8 carbon atoms, such as methyl, ethyl, n-propyl, isopropyl, n-butyl, n-pentyl, n-hexyl, 2-ethylhexyl, n-octyl, 3,3,3-trifluoropropyl, 4,4,4-trifluorobutyl, and 4,4,4,3,3-pentafluorobutyl radicals;

(b) Cycloalkyl and halocycloalkyl radicals containing from 4 to 8 carbon atoms, such as cyclopentyl, cyclohexyl, methylcyclohexyl, 2,3-difluorocyclobutyl, or 3,4-difluoro-5-methylcycloheptyl radicals;

(c) Alkenyl radicals containing from 2 to 4 carbon atoms, such as vinyl, allyl or 2-butenyl radicals;

(d) Aryl and haloaryl radicals containing from 6 to 8 carbon atoms, such as phenyl, tolyl, xylyl, chlorophenyl, dichlorophenyl or trichlorophenyl radicals; and (e) Cyanoalkyl radicals, the alkyl moieties of which contain from 2 to 3 carbon atoms, such as β-cyanoethyl and γ-cyanopropyl radicals.

As specific examples of moieties according to the formula $R_2SiO$, representative are those of the formulae: $(CH_3)_2SiO$, $CH_3(CH_2=CH)SiO$, $CH_3(C_6H_5)SiO$, $(C_6H_5)_2SiO$, $CF_3CH_2CH_2(CH_3)SiO$, $NC-CH_2CH_2(CH_3)SiO$, $NCCH(CH_3)CH_2(CH_2=CH)-SiO$, $NC-CH_2CH_2CH_2(C_6H_5)SiO$.

It will be appreciated that, in an alternative embodiment of the invention, the polymers (A) can be a mixture of α,ω-dihydroxydiorganopolysiloxane polymers differing from each other only in molecular weight and/or the nature of the groups bonded to the silicone atoms.

These α,ω-dihydroxydiorganopolysiloxane polymers (A) are available commercially; furthermore, they can easily be prepared. One of the most widely used methods of preparation consists, in a first phase, in polymerizing diorganocyclopolysiloxanes in the presence of catalytic amounts of alkaline or acidic agents and then treating the products of polymerization with calculated amounts of water (French Patents Nos. 1,134,005, 1,198,749 and 1,198,749 and 1,226,745); this addition of water, which is proportionately greater the lower the viscosity of the polymers to be prepared, can be wholly or partially replaced by β,ω-dihydroxydiorganopolysiloxane oils of low viscosity ranging, for example, from 5 to 200 mPa.s at 25° C., and having a high content of hydroxyl radicals, for example from 3 to 14%. In a second phase, the polymers are isolated by removing, generally at a temperature above 100° C. and at a pressure preferably below atmospheric pressure, the diorganocyclopolysiloxanes which balance the reaction and the other polymers of relatively low molecular weight which are formed during this reaction. It is advisable to neutralize the alkaline or acidic agents used as polymerization catalysts, before distilling the volatile products.

The preferred polymers (A) are α,ω-dihydroxydimethylpolysiloxanes which therefore consist essentially of moieties of the formula $(CH_3)_2SiO$; however, they can contain up to 10 mol % of moieties of the formula $CH_3(CH_2=CH)SiO$ and/or $(C_6H_5)_2SiO$.

The cross-linking agent (B) is generally used in a proportion of 2 to 25 parts, preferably 3 to 20 parts per 100 parts of the α,ω-dihydroxydiorganopolysiloxane polymer (A). As above mentioned, it comprises from 20 to 100% by weight, preferably 30 to 100%, of methyltriacetoxysilane of the formula $CH_3Si(OCOCH_3)_3$ and 80 to 0%, preferably 70 to 0%, of ethyltriacetoxysilane of the formula $C_2H_5Si(OCOCH_3)_3$. Both of these compounds are well known as cross-linking agents for cold self-curing compositions. However, they can contain a small quantity, for example, 1 to 5% by weight, of condensation products, such as those of the formulae: $(CH_3COO)_2CH_3SiOSiCH_3(OCOCH_3)_2$ and $(CH_3COO)_2C_2H_5SiOSiC_2H_5(OCOCH_3)_2$.

Silanes (F) containing only 2 hydrolyzable radicals and corresponding to the general formula: $R'_2Si(OCOCH_3)_2$ can be combined with these cross-linking agents (B).

The symbols R', which may be identical or different, denote methyl, ethyl, vinyl, phenyl or tert-butoxy radicals.

As specific examples of these silanes (F), representative are those of formula: $(CH_3)_2Si(OCOCH_3)_2$, $CH_3(C_2H_5)Si(OCOCH_3)_2$, $(C_2H_5)_2Si(OCOCH_3)_2$, $CH_2=CH(CH_3)Si(OCOCH_3)_2$, $[(CH_3)_3CO]_2Si(OCOCH_3)_2$.

The molar quantity of the silanes (F) of the formula $R'_2Si(OCOCH_3)_2$ which can be used is not indefinite; in fact, the mixture comprising these silanes (F) and of the cross-linking agents (B) must contain on average at least 2.5 hydrolyzable groups per 1 silicon atom, forming part of (F) or (B).

The curing catalyst (D) is used in a catalytically effective amount generally in a proportion of up to 5 parts, preferably up to 4.5 parts, per 100 parts of α,ω-dihydroxydiorganopolysiloxane polymers (A). It is typically selected from among:

(a) metal salts of carboxylic acids, preferably organotin salts of carboxylic acids, such as dibutyltin diacetate and dilaurate;

(b) products of reaction of organotin salts of carboxylic acids with titanic esters (U.S. Pat No. 3,409,753); and (c) organic titanium and zirconium derivatives such as titanic and zirconic esters (French Patents Nos. 2,531,095, 2,539,422 and 2,539,423).

The fillers (E) are used in a proportion of up to 250 parts, preferably up to 200 parts, per 100 parts of the α,ω-dihydroxydiorganopolysiloxane polymer (A). They are advantageously selected from among inorganic fillers which are in the form of finely divided particles, with a mean particle diameter smaller than 0.1 μm. These fillers include fumed or pyrogenic silicas, precipitated silicas and silica aerogels. Their specific surface is generally greater than 40 m²/g, and in most cases is in the range 150–200 m²/g.

The inorganic fillers can also be in the form of more coarsely divided materials, with a mean diameter greater than 0.1 μm. As examples of such fillers, representative are ground quartz, diatomaceous silicas, calcium carbonate, calcined clay, rutile-type titanium dioxide; iron, zinc, chromium, zirconium or magnesium oxides, various forms of alumina (hydrated or otherwise), boron nitride, lithopone, and barium metaborate; their specific surface is generally below 30 m²/g.

The following can be used in addition to the inorganic fillers:

Metallic fillers such as powdered iron, copper, aluminum and lead;

Organic fillers based on, for example, cork, polytetrafluoroethylene, polyethylene, polypropylene, polyamide or polycarbonate; and Various fillers based on carbon black or glass fibers.

The fillers (E) are used as such or after they have been modified by treatment with organosilicon compounds. The latter usually include organochlorosilanes, diorganocyclopolysiloxanes, hexaorganodisiloxanes, hexaorganodisilazanes or diorganocyclopolysilazanes (French Patents Nos. 1,126,884, 1,136,885, 1,236,505, and British Patent No. 1,024,234). In the majority of cases, the treated fillers contain from 3 to 30% of their weight of organosilicon compounds.

The fillers (E) can comprise a mixture of fillers of several types with different particle size distributions; thus, for example, they can comprise 30 to 70% of finely divided silicas with a specific surface greater than 50 m²/g and 70 to 30% of more coarsely divided silicas with a specific surface below 40 m²/g.

In addition to the fillers (E), other compounds can be added during the preparation of the compositions according to the invention, for example, heat stabilizers; these materials, whose presence improves the heat resistance of silicone elastomers, include, in particular, rare-earth salts, oxides and hydroxides (such as ceric oxides and hydroxides) and titanium and iron oxides, and especially those prepared by combustion. They can be used in a proportion of 0.1 to 15 parts and preferably from 0.15 to 12 parts per 100 parts of the $\alpha,\omega$-dihydroxydiorganopolysiloxane polymers (A).

Still other compounds can be added, for example, additives which improve flame resistance; they are usually selected from among organophosphorus derivatives, halogenated organic compounds and organic or inorganic derivatives of platinum.

The component (C) which characterizes the invention is generally used in a proportion which represents 5 to 35% by weight, preferably 7 to 32%, relative to the cross-linking agent (B).

It is intended to depress the crystallization point of the cross-linking agent (B) or, more precisely, to make it less subject to crystallization. It should, however, have other qualities, especially of having no marked and adverse effects on the physical and chemical characteristics of the compositions according to the invention and of the elastomers derived therefrom. It must also be relatively unreactive towards the environment and be relatively nonvolatile, because of the risk of flammability. These conditions are met when the constituent (C) is selected from among the diesters of ortho-phthalic acid with monoalcohols of the formula GOH, in which G is a hydrocarbon radical containing 4 to 12 carbon atoms. More specifically, G can be:

An alkyl radical, such as the n-butyl, isobutyl, n-hexyl, 2-ethylhexyl, n-octyl, n-decyl, or n-dodecyl radical;

A cycloaliphatic radical substituted or unsubstituted (by an alkyl radical), such as the cyclopentyl, methylcyclopentyl, cyclohexyl or methylcyclohexyl radical; or A phenylalkyl radical, such as the benzyl, 2-phenylethyl, 1-phenylethyl or 3-phenylpropyl radical.

As specific examples of these diesters, representative are butyl benzyl phthalate, butyl decyl phthalate and butyl cyclohexyl phthalate.

The component (C) can also be selected from the esters of acetic acid with monoalcohols of the formula G'OH, in which G' is a hydrocarbon radical containing from 6 to 18 carbon atoms.

More specifically, G' can be:

An alkyl radical, such as the n-hexyl, 2-ethylhexyl, n-octyl, n-decyl, n-dodecyl, tridecyl, n-pentadecyl or n-octadecyl radical;

A cycloaliphatic radical substituted or unsubstituted (by an alkyl radical), such as the cyclohexyl, cycloheptyl, methylcyclohexyl, ethylcyclohexyl, n-propylcyclohexyl, n-butylcyclohexyl or tert-butylcyclohexyl radical; or A phenylalkyl radical, such as the benzyl, 1-phenylethyl, 2-phenylethyl or 3-phenylpropyl radical.

As specific examples of these esters, representative are benzyl acetate, 2-phenylethyl acetate and para-tert-butylcyclohexyl acetate.

These various organic compounds are liquids, miscible in all proportions with the cross-linking agent (B), and inert towards the various components an additives constituting the compositions according to the invention. Furthermore, they have a boiling point at atmospheric pressure above 150° C., preferably above 180° C., and a flash point above 80° C., preferably above 100° C.

To manufacture the compositions according to the invention, it is recommended to use an apparatus which enables the components (A), (B), (C), (D) and (E), and the other optional adjuvants, to be compounded intimately in the absence of moisture, with or without the introduction of heat.

All of these ingredients can be charged into the apparatus in any order of addition whatever. Thus, it is possible to first mix the $\alpha,\omega$-dihydroxydiorganopolysiloxane oils (A) and the fillers (E) and then to add to the resulting paste the cross-linking agents (B), the additives (C) and the catalysts (D); in this process, the agents (B) and the additives (C) can be added separately, or in the form of mixtures thereof.

It is also possible to mix the oils (A), the cross-linking agents (B) (mixed or otherwise with the additives (C) beforehand) and subsequently to add the fillers (E) and the catalysts (D) to the reaction products of these 2 components; the additives (C) are added at the same time as (E) and (D) insofar as they have not been completely added at the beginning of the operation.

During this process, the mixtures can be heated to a temperature situated, for example, in the range 50° to 180° C., under atmospheric pressure or under a reduced pressure in order to remove volatile substances such as water, low molecular weight polymers and acetic acid; in the case of heating above 90° C. it is preferable to introduce the additives (C) after the heating period has been completed.

The compositions according to the invention are stable when stored in the absence of water, and cure to form elastomers, in the presence of water, at ambient temperature and above.

After the compositions have been deposited onto solid substrates, in a moist atmosphere, it is found that their cure to elastomers takes place from the outside towards the interior of the deposited mass. A surface skin forms first and then the cross-linking continues in depth. The complete formation of the skin, which is perceived as a nonsticky feel of the surface, requires a period of time which is usually in the range from 1 minute to 50 minutes; this time period depends upon the degree of relative humidity of the atmosphere surrounding the compositions and on the ease with which the latter cross-link.

Furthermore, the cure in depth of the deposited layers, which must be adequate to permit the demolding and handling of the elastomers formed, requires a longer period of time. This period depends, in fact, not only on the factors referred to above in respect of the formation of a nonsticky feel, but also on the thickness of the deposited layers, which thickness generally ranges from 0.5 mm to several centimeters. This longer period of time usually ranges from 10 minutes to 15 hours.

Once they have cured to elastomers, the compositions can adhere to any substrate without the preliminary deposition of a primer; more precisely, adhesion is more especially efficient on glass substrates or on substrates of any type which are coated with layers of paint.

Nevertheless, when the substrates coated with the elastomers are subjected to considerable thermal, mechanical or other stresses, the application of a primer, which in most cases consists of a solution of organosilicon and/or titanium compounds (French Patents Nos. 1,199,509 and 2,208,255), is recommended.

The compositions can be used for numerous applications, such as sealing in the building industry, the assembling of the widest variety of materials (metals, plastics, natural and synthetic rubbers, wood, cardboard, porcelain, brick, ceramics, glass, stone, concrete, masonry components), insulation of electrical conductors, coating of electronic circuits, and the preparation of thin molds used for the manufacture of articles made of synthetic resins or foams.

The advantage of the presence of the additives (C) is that the compositions obtained remain homogeneous, and consequently free from granules or crystals, or agglomerates of crystals, over a range of temperatures from ambient temperature to temperatures in the region of −40° C. They process easily and, in particular, spread properly on the widest variety of substrates ranging, for example, from ceramics to glass fiber cloths; in addition, they yield elastomers whose surfaces are smooth and uniform in appearance. It is obvious that the presence of granules or crystals is highly inconvenient in coatings, seals, transparent elastomers or even in nontransparent, but thin, coatings.

In order to further illustrate the present invention and the advantages thereof, the following specific examples are given, it being understood that same are intended only as illustrative and in nowise limitative.

EXAMPLE 1

The likelihood of crystallization of various cross-linking agents was assessed by means of differential calorimetric analysis. The apparatus used was the Mettler TA 3000 system equipped with a DSC 30 cell. The programmed cooling (2° C. per minute) made it possible to decrease from ambient temperature to −100° C. Each specimen of the cross-linking agents to be tested (approximately 8 to 10 microliters) was placed in an aluminum crucible which was then closed in a leakproof manner by crimping; another crucible which was identical, but did not contain a specimen, was used as a reference. Measurements were made of, on the one hand, the temperature at the beginning and at the end of the exothermic peak corresponding to the crystallization phase and, on the other hand, the intensity of this exothermic peak.

The results are reported in the Table below. This Table also reports the nature of the cross-linking agents employed; methyltriacetoxysilane, which constituted a part or all of the cross-linking agents, was a supercooled liquid, its melting point being on the order of 42° C.

TABLE

| Nature of the crosslinking agent | Exothermic peak | | |
|---|---|---|---|
| | Start T° | End T° | Intensity in milliwatts |
| Methyltriacetoxysilane alone | −20° C. | −30° C. | 15 |
| Methyltriacetoxysilane mixed with 20% of its weight of benzyl acetate | | No peak | |
| Methyltriacetoxysilane mixed with 20% of its weight of para-tert-butyl cyclohexyl acetate | −42° C. | −55° C. | 0.2 |
| Methyltriacetoxysilane mixed with 20% of its weight of butyl benzyl phthalate | | No peak | |

From the above Table, it will be seen that the supercooled methyltriacetoxysilane had a very clear exothermic peak in the range −20° C., −30° C., which indicates a clear propensity for crystallization.

The addition of 20% by weight, relative to methyltriacetoxysilane, of benzyl acetate or of butyl benzyl phthalate shifted the exothermic peak beyond −100° C. The addition of 20% by weight, again relative to methyltriacetoxysilane, of tert-butylcyclohexyl acetate appeared to be slightly less effective, but the intensity of the exothermic peak was very low, which indicates poor propensity for crystallization.

EXAMPLE 2

The following ingredients were introduced into a kneader:
(i) 100 parts of an α,ω-dihydroxydimethylpolysiloxane oil having a viscosity of 80,000 mPa.s at 25° C.;
(ii) 16 parts of a methylpolysiloxane oil having a viscosity of 60 mpa.s at 25° C., containing 0.9% Of hydroxyl radicals bonded to silicon atoms, and consisting of the moieties $(CH_3)_3SiO_{0.5}$, $(CH_3)_2SiO$ and $CH_3SiO_{1.5}$, whose molar ratio $(CH_3)_3Si_{0.5}/(CH_3)_2SiO$ was 0.04 and the molar ratio $CH_3SiO_{1.5}(CH_3)_2SiO$ was 0.4; and
(iii) 14 parts of a fumed silica having a specific surface of 200 m$^2$/g, treated with octamethylcyclotetrasiloxane.

The entire mass was kneaded at 150° C. for 2 hours, in the absence of ambient air, in an atmosphere of dry nitrogen.

When the homogeneous mixture thus produced had cooled sufficiently and had reached approximately 50° C., 6 parts of methyltriacetoxysilane and 0.003 part of butyl titanate were added thereto; the entire mass was then kneaded for 1 hour. The self-curing composition C₁ obtained was placed in appropriate receptacles which were impervious to ambient air.

Two other compositions were produced by following the above process precisely, except that:

(1) in the case of one, referred to as C₂, the 6 parts of methyltriacetoxysilane were replaced by 7.2 parts of a homogeneous liquid mixture consisting of 6 parts of methyltriacetoxysilane and 1.2 parts of butyl benzyl phthalate;

(2) in the case of the other, referred o as C₃, the 6 parts of methyltriacetoxysilane were replaced by 7.5 parts of a homogeneous liquid mixture consisting of 6 parts of methyltriacetoxysilane and 1.5 parts of benzyl acetate.

The compositions C₂ and C₃ were also placed in appropriate receptacles which were impervious to ambient air.

The various receptacles containing the compositions C₁, C₂ and C₃ were stored at 0° C. for 2 months and then at −25° C. for another 2 months and finally at ambient temperature for 8 days. At the end of this period of time, the receptacles were opened and it was found:

(a) that the composition C₁ contained a very large number of dispersed or agglomerated crystals mixed with whitish granules; and (b) that the compositions C₂ and C₃ contained neither crystals nor granules.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A single-component organopolysiloxane composition, storage-stable in the absence of water and curing into an elastomer at ambient temperature and above in the presence of water, which comprises:

(A) at least one α,ω-dihydroxydiorganopolysiloxane polymer;
   (B) a methyltriacetoxysilane cross-linking agent therefor; and
   (C) an effective amount of at least one additive for preventing the crystallization of said cross-linking agent (B), miscible therewith in all proportions and liquid at ambient temperature, said additive comprising:
      (i) a diester of ortho-phthalic acid with a monoalcohol of the formula GOH, wherein G is a hydrocarbon radical containing from 4 to 12 carbon atoms; or
      (ii) an ester of acetic acid with a monoalcohol of the formula G'OH, wherein G' is a hydrocarbon radical containing from 6 to 18 carbon atoms.

2. The organopolysiloxane composition as defined by claim 1, wherein the component (C) comprises butyl benzyl phthalate, butyl decyl phthalate, butyl cyclohexyl phthalate, benzyl acetate, 2-phenylethyl acetate, or para-tert-butylcyclohexyl acetate.

3. The organopolysiloxane composition as defined by claim 1, wherein the polymer (A) has a viscosity of 700 to 1,000,000 mPa.s at 25° C. and comprises a sequence of diorganosiloxy moieties of the formula $R_2SiO$, in which the symbols R, which may be identical or different, are hydrocarbon radicals containing from 1 to 8 carbon atoms, or substituted such radicals bearing at least one halogen atom or cyano group substituent.

4. The organopolysiloxane composition as defined by claim 3, wherein the polymer (A) consists essentially of sequence of diorganopolysiloxane moieties of the formula $(CH_3)_2SiO$ and contains up to 10 mol % of moieties of the formula $CH_3(CH_2=CH)SiO$ and/or $(C_6H_5)_2SiO$.

5. The organopolysiloxane composition as defined by claim 1, wherein up to 80% by weight of (B) comprises ethyltriacetoxysilane.

6. The organopolysiloxane composition as defined by claim 1, comprising:
   (a) 100 parts of said polymers (A);
   (b) 2 to 25 parts of the cross-linking agent (B); and
   (c) 5 to 35% by weight of (C), relative to the weight of the cross-linking agent (B).

7. The organopolysiloxane composition as defined by claim 1, further comprising a catalytically effective amount of a curing catalyst (D).

8. The organopolysiloxane composition as defined by claim 7, further comprising up to 250 parts of filler (E) per 100 parts of polymer (A).

9. The organopolysiloxane composition as defined by claim 1, further comprising, with said cross-linking agent (B), a silane (F) of the formula: $R'_2Si(OCOCH_3)_2$ in which the symbols R', which may be identical or different, are each a methyl, ethyl, vinyl, phenyl or tert-butoxy radical, in an amount such that the combination of (F) and (B) contains on average at least 2.5 hydrolyzable groups per one silicon atom constituting said constituents (F) or (B).

10. A cured elastomer comprising the organopolysiloxane composition as defined by claim 1.

11. A cured elastomer comprising the organopolysiloxane composition as defined by claim 7.

12. A shaped article comprising a substrate coated with the organopolysiloxane composition as defined by claim 1.

13. A shaped article comprising a substrate coated with the cured elastomer as defined by claim 10.

14. A shaped article comprising a substrate coated with the cured elastomer as defined by claim 11.

* * * * *